United States Patent
O'Neill et al.

(10) Patent No.: US 10,903,483 B2
(45) Date of Patent: Jan. 26, 2021

(54) HIGH ENERGY MATERIALS FOR A BATTERY AND METHODS FOR MAKING AND USE

(71) Applicant: Wildcat Discovery Technologies, Inc., San Diego, CA (US)

(72) Inventors: Cory O'Neill, San Diego, CA (US); Steven Kaye, San Diego, CA (US)

(73) Assignee: WILDCAT DISCOVERY TECHNOLOGIES, INC, San Diego, CA (US)

( * ) Notice: Subject to any disclaimer, the term of this patent is extended or adjusted under 35 U.S.C. 154(b) by 370 days.

(21) Appl. No.: 14/837,541

(22) Filed: Aug. 27, 2015

(65) Prior Publication Data

US 2017/0062806 A1 Mar. 2, 2017

(51) Int. Cl.

| | |
|---|---|
| *H01M 4/136* | (2010.01) |
| *H01M 4/58* | (2010.01) |
| *C01G 3/04* | (2006.01) |
| *C01G 53/04* | (2006.01) |
| *C01G 23/00* | (2006.01) |
| *H01M 4/36* | (2006.01) |
| *C01G 53/00* | (2006.01) |
| *C01G 39/00* | (2006.01) |
| *H01M 10/0525* | (2010.01) |

(52) U.S. Cl.
CPC .............. *H01M 4/136* (2013.01); *C01G 3/04* (2013.01); *C01G 23/003* (2013.01); *C01G 39/00* (2013.01); *C01G 53/04* (2013.01); *C01G 53/40* (2013.01); *H01M 4/362* (2013.01); *H01M 4/582* (2013.01); *C01P 2006/40* (2013.01); *H01M 10/0525* (2013.01)

(58) Field of Classification Search
CPC ...... H01M 4/136; H01M 4/582; H01M 4/626; H01M 10/052
USPC ........................................................ 252/500
See application file for complete search history.

(56) References Cited

U.S. PATENT DOCUMENTS

| | | | |
|---|---|---|---|
| 4,725,422 | A | 2/1988 | Miyabayashi et al. |
| 5,378,560 | A | 1/1995 | Tomiyama |
| 6,346,349 | B1 | 2/2002 | Briscoe et al. |
| 6,613,213 | B1 | 9/2003 | Reilly et al. |
| 6,810,061 | B2 | 10/2004 | Hori et al. |

(Continued)

FOREIGN PATENT DOCUMENTS

| | | |
|---|---|---|
| CN | 101794877 A | 8/2010 |
| CN | 101752561 B | 8/2012 |

(Continued)

OTHER PUBLICATIONS

Mansour et al. "In situ X-ray absorption spectroscopic investigation of the electrochemical conversion reaction of $CuF_2$—$MoO_3$ nanocomposite". Journal of Solid State Chemistry 183 (2010) 3029-3038. Available Oct. 8, 2010. Total pp. 10.*

(Continued)

*Primary Examiner* — Katie L. Hammer
(74) *Attorney, Agent, or Firm* — Philip S. Hof; The Small Patent Law Group, LLC

(57) ABSTRACT

A composition for forming an electrode. The composition includes a hybrid active material compound doped with a dopant. The hybrid active material comprises the reaction product of a metal fluoride compound and a metal complex. A method of making the composition is included.

20 Claims, 1 Drawing Sheet

(56) References Cited

U.S. PATENT DOCUMENTS

| | | |
|---|---|---|
| 6,964,827 B2 | 11/2005 | Barker et al. |
| 7,261,872 B2 | 8/2007 | Greer |
| 7,371,338 B2 | 5/2008 | Amatucci |
| 7,625,671 B2 | 12/2009 | Amatucci |
| 7,678,503 B2 | 3/2010 | Manthiram et al. |
| 7,923,149 B2 | 4/2011 | Hwang et al. |
| 7,947,392 B2 | 5/2011 | Amatucci et al. |
| 8,039,149 B2 | 10/2011 | Amatucci et al. |
| 8,119,285 B2 | 2/2012 | Hatta et al. |
| 8,257,866 B2 | 9/2012 | Loveness et al. |
| 8,389,162 B2 | 3/2013 | Hwang et al. |
| 8,916,062 B2 | 12/2014 | Tong et al. |
| 9,099,735 B2 | 8/2015 | Caldwell et al. |
| 2003/0027049 A1 | 2/2003 | Barker et al. |
| 2005/0062404 A1 | 3/2005 | Jones et al. |
| 2005/0191554 A1 | 9/2005 | Soga |
| 2006/0019163 A1* | 1/2006 | Amatucci ............... H01M 4/58 429/220 |
| 2006/0035148 A1 | 2/2006 | Balaya et al. |
| 2007/0243466 A1 | 10/2007 | Amatucci et al. |
| 2007/0285498 A1 | 12/2007 | Shiomi |
| 2008/0199772 A1 | 8/2008 | Amatucci et al. |
| 2009/0186276 A1 | 7/2009 | Zhamu et al. |
| 2009/0220858 A1 | 9/2009 | Cheng et al. |
| 2009/0246636 A1* | 10/2009 | Chiang ................ H01M 2/166 429/231.95 |
| 2010/0123116 A1 | 5/2010 | Ghenciu et al. |
| 2010/0261063 A1 | 10/2010 | Kitagawa et al. |
| 2010/0297499 A1 | 11/2010 | Tong et al. |
| 2011/0065001 A1* | 3/2011 | Pereira ................... C01G 49/02 429/219 |
| 2011/0121240 A1 | 5/2011 | Amine et al. |
| 2011/0226985 A1 | 9/2011 | Park et al. |
| 2011/0229761 A1 | 9/2011 | Cui et al. |
| 2011/0244331 A1 | 10/2011 | Karthikeyan et al. |
| 2012/0032165 A1* | 2/2012 | Bae .................. H01L 21/02381 257/43 |
| 2012/0040247 A1 | 2/2012 | Manivannan et al. |
| 2012/0164532 A1 | 6/2012 | Senoue et al. |
| 2012/0176089 A1 | 7/2012 | Hwang et al. |
| 2012/0305855 A1 | 12/2012 | Kim et al. |
| 2013/0022874 A1 | 1/2013 | Park et al. |
| 2013/0065126 A1 | 3/2013 | Caldwell et al. |
| 2013/0216701 A1 | 8/2013 | Lopez et al. |
| 2013/0216913 A1 | 8/2013 | Tode et al. |
| 2013/0252105 A1 | 9/2013 | Lee et al. |
| 2013/0264512 A1 | 10/2013 | Kwon et al. |
| 2013/0273429 A1 | 10/2013 | Yu |
| 2013/0344386 A1 | 12/2013 | Kim et al. |
| 2014/0038056 A1 | 2/2014 | Johnson et al. |
| 2014/0054493 A1 | 2/2014 | Kim et al. |
| 2014/0057163 A1 | 2/2014 | Bae et al. |
| 2014/0087261 A1 | 3/2014 | Li et al. |
| 2014/0264190 A1* | 9/2014 | Tong ...................... H01M 4/364 252/512 |
| 2014/0272580 A1 | 9/2014 | Frianeza-Kullburg |
| 2014/0272581 A1* | 9/2014 | Kaye ..................... H01M 4/366 429/218.1 |
| 2015/0155546 A1* | 6/2015 | Yushin ................. H01M 4/136 427/78 |
| 2016/0164135 A1* | 6/2016 | Fasching .............. H01M 4/136 429/319 |

FOREIGN PATENT DOCUMENTS

| | | | |
|---|---|---|---|
| CN | 102881878 A | | 1/2013 |
| CN | 102881894 B | | 1/2015 |
| EP | 0165047 B1 | | 10/1997 |
| EP | 2511973 A1 | | 10/2012 |
| GB | 1383957 A | | 2/1974 |
| JP | 1998112333 A | | 4/1998 |
| JP | 111329415 A | | 11/1999 |
| JP | 2001015111 A | | 1/2001 |
| JP | 2002015727 A | | 1/2002 |
| JP | 2002237334 A | | 8/2002 |
| JP | M02373643 A | | 12/2002 |
| JP | 2006202647 A | | 8/2006 |
| JP | 2007048711 A | | 2/2007 |
| JP | 2007515762 A | | 6/2007 |
| JP | 2008186595 A | | 8/2008 |
| JP | 2010518560 A | | 5/2010 |
| JP | 2013513904 A | | 4/2013 |
| KR | 1020060029048 | | 4/2006 |
| KR | 1020060109305 A | | 10/2006 |
| KR | 1020070117826 A | | 12/2007 |
| WO | 2004034489 A | | 4/2004 |
| WO | 2004051772 A | | 6/2004 |
| WO | 2005062404 A1 | | 7/2005 |
| WO | 2008095197 A2 | | 8/2008 |
| WO | 2008100002 A1 | | 8/2008 |
| WO | 2009048146 A1 | | 4/2009 |
| WO | 2011069348 A1 | | 6/2011 |
| WO | 2011071068 A | | 6/2011 |
| WO | 2012176902 A | | 12/2012 |

OTHER PUBLICATIONS

Liu et al. "Excellent cycle performance of Co-doped FeF3/C nanocomposite cathode material for lithium-ion batteries". Journal of Materials Chemistry. 2012, 22, 17539. Published Jul. 5, 2012. Total pp. 12.*

Applied Battery Research for Transportation (B&R No. VT-1102000), Progress Report for Second Quarter FY 2012, May 2012.

Applied Battery Research for Transportation (B&R No. VT-1102000), Progress Report for Second Quarter FY 2013, Jun. 2013.

Badway et al., "High-Capacity Reversible Metal Fluoride Conversion Materials as Rechargeable Positive Electrodes for Li Batteries", Journal of the Electrochemical Society, 150, 10, A1318-A1327, 2003.

Badway et al., "Next Generation Positive Electrode Materials Enabled by Nanocomposites: Metal Fluorides", MRS Proceedings. vol. 756. No. 1. Cambridge University Press, 2002.

Badway et al., "Structure and Electrochemistry of Copper Fluoride Nanocomposites Utilizing Mixed Conducting Matrices", Chemical Materials 2007, 19, 4129-4141.

International Search Report and Written Opinion dated Aug. 14, 2014 in International Application No. PCT/US2014/028478.

International Search Report and Written Opinion dated Jul. 25, 2014 in International Application No. PCT/US2014/028506.

Johnson, "Arresting VF: theory-guided synthetic approaches to cathodes," Argonne National Laboratory, Jan. 24, 2013.

Liu, Li et al., "Excellent cycle performance of Co-doped FeF3/C nanocomposite cathode material for lithium-ion batteries", Journal of Material Chemistry, 2012, 22, 17539.

Liu, Xiu-Ming et al., "Effects of MoO3 encapsulating on performances of CuF2 cathode material for application of lithium primary batteries", The Chinese Journal of Nonferrous Metals, Feb. 2010, vol. 20 No. 2, 288-292.

Mansour, A.N. et al., "In situ X-ray absorption spectroscopic investigation of the electrochemical conversion reactions of CuF2—MoO3 nano composite", Journal of Solid State Chemistry 183 (2010) 3029-3038; Oct. 8, 2010.

Sathiya, "High Performance Li2Ru1-yMnyO3 (0.2 ≤ y ≤ 0.8) Cathode Materials for Rechargeable Lithium-Ion Batteries: Their Understanding", Chemical Materials, 2013, 25, 1121-1131.

Sathiya, M., et al., "Reversible anionic redox chemistry in high-capacity layered-oxide electrodes", Nature Materials, vol. 12, No. 9, pp. 827-835.

Song, "Influence of Ru substitution on Li-rich 0.55Li2MnO3•0.45LiNi1/3Co1/3Mn1/3O2 cathode for Li-ion batteries", Electrochimica Acta 80 (2012) 187-195.

Yu, "Initial Coulombic efficiency improvement of the Li1.2Mn0.567Ni0.166Co0.067O2 lithium-rich material by ruthenium substitution for manganese," Journal of Material Chemistry, 2012, 22, 15507.

(56) References Cited

OTHER PUBLICATIONS

A.N. Mansour, et al., "In situ X-ray absorption spectroscopic investigation of the electrochemical conversion reactions of CuF2-Mo03 nanocomposite", Journal of Solid State Chemistry, vol. 183, No. 12, Oct. 8, 2010, pp. 3029-3038.
F. Badway, et al., "Structure and Electrochemistry of Copper Fluoride Nanocomposites Utilizing Mixed Conducting Matrices", Chemistry of Materials, vol. 19, No. 17, Aug. 1, 2007, pp. 4129-4141.
International Search Report and Written Opinion dated Aug. 11, 2014 in International application No. PCT/US2014/028271.
Non-Final Office Action dated Jul. 5, 2016 in connection with JP application No. 2014-530764.
International Search Report & Written Opinion dated Dec. 21, 2016 in International Application No. PCT/US2016/048425.

* cited by examiner

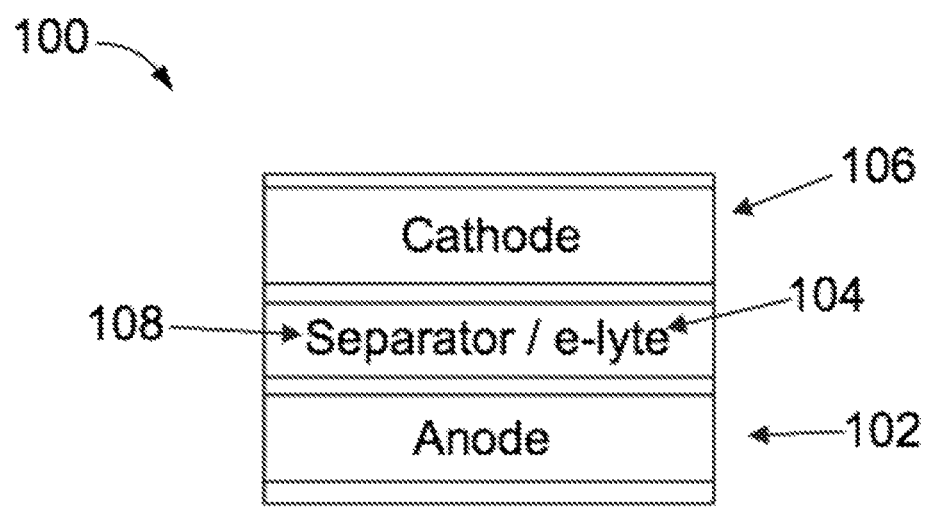

HIGH ENERGY MATERIALS FOR A BATTERY AND METHODS FOR MAKING AND USE

BACKGROUND OF THE INVENTION

The present invention is in the field of battery technology, and more particularly in the area of materials for making high-energy electrodes for batteries, including metal-fluoride materials.

One type of battery consists of a negative electrode made primarily from lithium and a positive electrode made primarily from a compound containing a metal and fluorine. During discharge, lithium ions and electrons are generated from oxidation of the negative electrode while fluoride ions are produced from reduction of the positive electrode. The generated fluoride ions react with lithium ions near the positive electrode to produce a compound containing lithium and fluorine, which may deposit at the positive electrode surface.

Metal fluoride based batteries are an attractive energy storage technology because of their extremely high theoretical energy densities. For example, certain metal fluoride active materials can have theoretical energy densities greater than about 1600 Wh/kg or greater than about 7500 Wh/L. Further, metal fluorides have a relatively low raw material cost, for example less than about $10/kg. However, a number of technical challenges currently limit their widespread use and realization of their performance potential.

One challenge for certain metal fluoride materials is comparatively poor rate performance. Many metal fluoride active materials have electrochemical potentials greater than about 2.5 V because of their relatively large bandgap produced by the highly ionic bonding between the metal and fluorine, and in particular between a transition metal and fluorine. Unfortunately, one of the drawbacks to wide bandgap materials is the intrinsically low electronic conductivity that results from the wide bandgap. As a result of this low conductivity, discharge rates of less than 0.1 C are required in order to obtain full theoretical capacity. More typically, discharge rates of 0.05 C to 0.02 C are reported in the literature. Such low discharge rates limit the widespread use of metal fluoride active materials.

Another challenge for certain metal fluoride active materials is a significant hysteresis observed between the charge and discharge voltages during cycling. This hysteresis is typically on the order of about 1.0V to about 1.5V. While the origin of this hysteresis is uncertain, current evidence suggests that kinetic limitations imposed by low conductivity play an important role. Further, asymmetry in the reaction paths upon charge and discharge may also play a role. Since the electrochemical potential for many of the metal fluorides is on the order of 3.0V, this hysteresis of about 1.0V to about 1.5V limits the overall energy efficiency to approximately 50%.

Limited cycle life is another challenge for certain metal fluoride active materials. Although rechargeability has been demonstrated for many metal fluoride active materials, their cycle life is typically limited to tens of cycles and is also subject to rapid capacity fade. Two mechanisms are currently believed to limit the cycle life for the metal fluoride active materials: agglomeration of metallic nanoparticles and mechanical stress due to volume expansion. It is believed that metal fluoride active materials can cycle by virtue of the formation during lithiation of a continuous metallic network within a matrix of insulating LiF. As the number of cycles increases, the metal particles tend to accumulate together into larger, discrete particles. The larger agglomerated particles in turn create islands that are electrically disconnected from one another, thus reducing the capacity and ability to cycle the metal fluoride active materials. The second limitation to extended cycle life is the mechanical stress imparted to the binder materials by the metal fluoride particles as a result of the volume expansion that occur during the conversion reaction. Over time, the binder is pulverized, compromising the integrity of the cathode. Notably, for the metal fluoride $CuF_2$, no demonstrations of rechargeability have been reported.

For $CuF_2$, an additional challenge prevents rechargeability. The potential required to recharge a $CuF_2$ electrode is 3.55 V. However, in typical electrolytes for lithium ion batteries, Cu metal oxidizes to $Cu^{2+}$ at approximately 3.5 V vs. $Li/Li^+$. The oxidized copper can migrate to the anode, where it is irreversibly reduced back to Cu metal. As a result, Cu dissolution competes with the recharge of Cu+2LiF to $CuF_2$, preventing cycling of the cell.

The following papers and patents are among the published literature on metal fluorides that employ mixed conductors that are not electrochemically active within the voltage window of the metal fluoride: Badway, F. et al., Chem. Mater., 2007, 19, 4129; Badway, F. et al., J. Electrochem. Soc., 2007, 150, A1318; "Bismuth fluoride based nanocomposites as electrode materials" U.S. Pat. No. 7,947,392; "Metal Fluoride And Phosphate Nanocomposites As Electrode Materials" US 2008/0199772; "Copper fluoride based nanocomposites as electrode materials" US 2006/0019163; and "Bismuth oxyfluoride based nanocomposites as electrode materials" U.S. Pat. No. 8,039,149.

Certain embodiments of the present invention can be used to form electrochemical cells having metal fluoride active material that exhibit improved rate performance, improved energy efficiency, and improved cycle life when compared to prior batteries. Certain embodiments demonstrate rechargeability. Thus, these and other challenges can be addressed by embodiments of the present invention described below.

BRIEF SUMMARY OF THE INVENTION

Certain embodiments include an electrode formed from a reaction product of a metal fluoride compound and a metal complex. A dopant is included in the reaction product compound via a doping process using a doping precursor. In some embodiments, the doping process uses a dopant amount of 0.1 equivalents or less. In some embodiments, the doping process uses a dopant amount of 0.02 equivalents or less. In some embodiments, the doping precursor includes a transition metal. In some embodiments, the transition metal is iron. In some embodiments, the doping precursor includes a post-transition metal. In some embodiments, the post-transition metal is aluminum. In some embodiments, the post-transition metal is bismuth. In some embodiments, the metal fluoride compound includes copper fluoride. In some embodiments, the metal complex includes a metal oxide. In some embodiments, the metal complex includes nickel oxide.

Certain embodiments include the method of making an electrochemical cell containing high-energy cathode materials and methods of use of such electrochemical cells.

BRIEF DESCRIPTION OF SEVERAL VIEWS OF THE DRAWINGS

FIG. 1 illustrates a lithium ion battery implemented in accordance with an embodiment of the invention.

DETAILED DESCRIPTION OF THE INVENTION

The following definitions apply to some of the aspects described with respect to some embodiments of the invention. These definitions may likewise be expanded upon herein. Each term is further explained and exemplified throughout the description, figures, and examples. Any interpretation of the terms in this description should take into account the full description, figures, and examples presented herein.

The singular terms "a," "an," and "the" include the plural unless the context clearly dictates otherwise. Thus, for example, reference to an object can include multiple objects unless the context clearly dictates otherwise.

The terms "substantially" and "substantial" refer to a considerable degree or extent. When used in conjunction with an event or circumstance, the terms can refer to instances in which the event or circumstance occurs precisely as well as instances in which the event or circumstance occurs to a close approximation, such as accounting for typical tolerance levels or variability of the embodiments described herein.

The term "about" refers to the range of values approximately near the given value in order to account for typical tolerance levels, measurement precision, or other variability of the embodiments described herein.

The terms "conductive," "conductor," "conductivity," and the like refer to the intrinsic ability of a material to facilitate electron or ion transport and the process of doing the same. The terms include materials whose ability to conduct electricity may be less than typically suitable for conventional electronics applications but still greater than an electrically insulating material.

The term "active material" and the like refers to the material in an electrode, particularly in a cathode, that donates, liberates, or otherwise supplies the conductive species during an electrochemical reaction in an electrochemical cell.

The term "transition metal" refers to a chemical element in groups 3 through 12 of the periodic table, including scandium (Sc), titanium (Ti), vanadium (V), chromium (Cr), manganese (Mn), iron (Fe), cobalt (Co), nickel (Ni), copper (Cu), zinc (Zn), yttrium (Y), zirconium (Zr), niobium (Nb), molybdenum (Mo), technetium (Tc), ruthenium (Ru), rhodium (Rh), palladium (Pd), silver (Ag), cadmium (Cd), hafnium (Hf), tantalum (Ta), tungsten (W), rhenium (Re), osmium (Os), iridium (Ir), platinum (Pt), gold (Au), mercury (Hg), rutherfordium (Rf), dubnium (Db), seaborgium (Sg), bohrium (Bh), hassium (Hs), and meitnerium (Mt).

The term "post-transition metal" refers a chemical element selected from the group consisting of gallium (Ga), indium (In), thallium (Th), tin (Sn), lead (Pb), bismuth (Bi), aluminum (Al), germanium (Ge), antimony (Sb), and polonium (Po).

The term "metals" refers to alkali metals, alkaline metals, transition metals, post-transition metals, lanthanides, and actinides as those terms are understood by one of ordinary skill in the art or as defined herein.

A rate "C" refers to either (depending on context) the discharge current as a fraction or multiple relative to a "1 C" current value under which a battery (in a substantially fully charged state) would substantially fully discharge in one hour, or the charge current as a fraction or multiple relative to a "1 C" current value under which the battery (in a substantially fully discharged state) would substantially fully charge in one hour.

The term "equivalent" refers to the stoichiometric ratio of a dopant to the elemental site in which it is doped. This term is used essentially interchangeably with terms such as "mole fraction" or "mole ratio." For example, for the situation of "doping=0.01," the amount of dopant is 0.01 stoichiometric equivalents and the amount of substrate (doping target) is 0.99 stoichiometric equivalents. Thus, the dopant is present as 0.01 mole fraction of the undoped amount of substrate (that is, there were 100 parts of substrate prior to doping; after doping there are 99 parts of substrate and 1 part of dopant).

To the extent certain battery characteristics can vary with temperature, such characteristics are specified at room temperature (about 30 degrees C.), unless the context clearly dictates otherwise.

Ranges presented herein are inclusive of their endpoints. Thus, for example, the range 1 to 3 includes the values 1 and 3 as well as intermediate values.

FIG. 1 illustrates a Li-ion battery 100 implemented in accordance with an embodiment of the invention. The battery 100 includes an anode 102, a cathode 106, and a separator 108 that is disposed between the anode 102 and the cathode 106. In the illustrated embodiment, the battery 100 also includes a high voltage electrolyte 104, which is disposed between the anode 102 and the cathode 106 and remains stable during high voltage battery cycling.

A battery 100 implemented in accordance with an embodiment of the invention include an anode 102, a cathode 106, and an electrolyte 104, as seen in FIG. 1. Typically a separator 108 is disposed between the anode 102 and the cathode 106. The operation of the battery is based upon reversible intercalation and de-intercalation of lithium ions into and from host materials of the anode and the cathode. Other implementations of the battery are contemplated, such as those based on conversion chemistry.

Embodiments of the invention disclosed herein include rechargeable, high energy cathode active materials, such as cathode active materials including metal fluorides, and in particular hybrid active materials including the reaction product of metal fluorides and metal complexes. Of particular interest are the metal fluoride active materials described in U.S. Patent Publication Nos. 2014/0264190, 2014/0264198, 2014/0272581, and 2014/0272586, each titled "High Energy Materials For A Battery And Methods For Making And Use" and each of which is hereby incorporated by reference as if set forth in this application.

In certain embodiments, a hybrid active material is prepared for use in a cathode with metal fluoride (MeF) active materials. In some embodiments, the hybrid active material, sometimes referred to herein as a hybrid material, is prepared by combining a metal fluoride and a metal complex, followed by heat treatment of the mixture under an inert atmosphere. According to certain embodiments, the heat treatment of the metal fluoride and metal complex (Me'X) causes a reaction to form a new phase according to the generalized Formula (I):

$$MeF_x + Me'_y X_z + heat \rightarrow Me_a Me'_b X_c F_d \quad (I)$$

where x, y, z, a, b, and c depend on the identity and valence of the Me, Me', and X (Me and Me' denote different metals and X denotes the complexing pair associated with Me'). In some instances, $0 < a \leq 1$, $0 < b \leq 1$, $0 \leq c \leq 1$, and $0 \leq d \leq 1$. In other embodiments, the heat treatment causes the formation of bonds (such as covalent bonds) between the metal fluoride and the metal complex, improving conductivity and passivating the surface.

Suitable metal complexes, which can act as precursors for the reaction described herein, for use in synthesizing the active material include, but are not limited to, $MoO_3$, $MoO_2$, $NiO$, $CuO$, $VO_2$, $V_2O_5$, $TiO_2$, $Al_2O_3$, $SiO_2$, $LiFePO_4$, $LiMe_TPO_4$ (where $Me_T$ is one or more transition metal(s)), metal phosphates, and combinations thereof. According to embodiments of the invention, these oxides can be used in Formula (I).

It is understood that the synthetic route for achieving the active material may vary, and other such synthetic routes are within the scope of the disclosure. The material can be represented by $Me_aMe'_bX_cF$ and in the examples herein is embodied by a $Cu_3Mo_2O_9$ active material. Other active materials are within the scope of this disclosure, for example, $NiCuO_2$, $Ni_2CuO_3$, and $Cu_3TiO_4$.

In the case of oxide-based hybrid materials, intimate mixing of the metal fluoride and the metal complex (or other suitable precursor material) and moderate heat treatment can be used to generate rechargeable electrode materials. Suitable metal complex precursors include materials that decompose to form metal oxides (and in particular, transition metal oxides) as opposed to using a metal oxide to directly react with the metal fluoride. Examples of such precursors include, but are not limited to, metal acetates, metal acetylacetonates, metal hydroxides, metal ethoxides, and other similar organo-metal complexes. In either event, the final rechargeable material is not necessarily a pure oxide or a purely crystalline material. The reaction of Formula II predicts that there would not be a pure oxide or a purely crystalline material. In some instances, the metal oxide precursor or metal oxide material can form a coating, or at least a partial coating, on the metal fluoride active material. Without being bound by a particular theory or mechanism of action, the reaction of the metal oxide precursor or metal oxide material with the surface of the metal fluoride (and in particular copper fluoride) active material is important for generating a rechargeable electrode active material.

For many of the rechargeable materials described herein (and in particular for materials including Mo, Ni, or Ti), the reactions described herein yield a new material at least at the surface of the particles of the metal fluoride active material. The novel material present at least at the surface of the particles of the metal fluoride active material is believed to provide many of the benefits disclosed herein. In certain embodiments disclosed herein, the hybrid active material is formed using various mixing and/or coating methods and from various precursors. Milling techniques (that is, agitating the mixture in a milling apparatus), solution coating techniques, physical vapor deposition (PVD) techniques and atomic layer deposition (ALD) techniques are applicable.

In certain embodiments, metal fluoride hybrid active materials are doped with cationic materials, anionic materials, or mixed materials. According to certain embodiments, the resulting doped cathode material demonstrates improved voltage performance with cation, anion, or mixed doping. Without being bound by a particular theory or mechanism of action, doping can improve the rate performance of metal fluoride hybrid active materials by improving the bulk conductivity of the resulting cathode material or favorably changing the bandgap of the cathode material. For example, improving the bulk conductivity of the active material can allow for discharge rates above the 0.1 C practical limit that is experienced with conventional conductive oxide matrix materials. Alternatively or additionally, the dopant can reduce the bandgap of the conductive matrix material and have a similar effect on the conductivity so as to improve the discharge rate of the doped cathode material. Alternatively, doping can induce the formation of a conductive metallic network upon discharge. Such networks have been shown to enhance conductivity in certain cathodes active materials.

Performance improvements include reduced irreversible capacity loss (ICL), reduced overpotential on charge, improved voltage stability on cycling, and improved cycle life, particularly at low rate cycling.

Formula (II) illustrates a general reaction scheme for cation doping to form a doped metal fluoride hybrid active material:

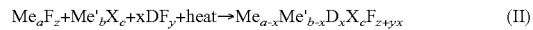

$$Me_aF_z+Me'_bX_c+xDF_y+heat\rightarrow Me_{a-x}Me'_{b-x}D_xX_cF_{z+yx} \quad (II)$$

where the values of a, b, c, x, y and z depend on the valence of the particular dopant (D) selected. The cationic dopant may be doped into sites of Me, Me', or both, which will affect a, b or both will have some or all of the value of x subtracted from them. Preferred cation dopants include certain metals, including certain transition metals (including, but not limited to, Co, Fe, Ti, Cr, Nb, Ta, V, Hg, Zn, Ag, Y, and Cd), or certain post-transition metals (including, but not limited to, Al, Ga, In, Sn, and Sb). According to certain embodiments, the cation dopant precursor ($DF_y$) can be $CoF_3$, $FeF_2$, $FeF_3$, $A_1F_3$, $BiF_3$, $YF_3$, $LaF_3$, $TiF_3$, $TiF_4$, $NbF_5$, $TaF_5$, $CrF_2$, $CrF_3$, $AgF_2$, $ZnF_2$, $CdF_2$, $Hg_2F_2$, $HgF_2$, $GaF_3$, $InF_3$, $SnF_2$, $SnF_4$, $SbF_3$, $CeF_3$, or combinations thereof. The cation dopant precursor can, more generally, include metals metal complexes such as metal salts and more particularly metal nitrates and metal acetates.

Formula (III) illustrates a general reaction scheme for anion doping to form a doped metal fluoride hybrid active material:

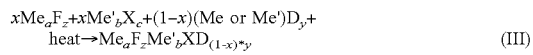

$$xMe_aF_z+xMe'_bX_c+(1-x)(Me\ or\ Me')D_y+heat\rightarrow Me_aF_zMe'_bXD_{(1-x)*y} \quad (III)$$

where the values of a, b, c, x, y and z depend on the valence of the particular dopant (D) selected. Preferred anion dopants include certain halogens (including, but not limited to, Cl, Br, and I) and certain chalcogens (including, but not limited to, O, S, and Se). According to certain embodiments, the anion dopant precursor can be $NisSi$, $NiO$, $NiS$, $NiSe$, $NiCl_2$, $NiBr_2$, $NiI$, $Cu_5Si$, $CuO$, $CuS$, $CuSe$, $CuCl_2$, $CuBr_2$, $CuI$, and combinations thereof.

Formula (IV) illustrates a general reaction scheme for mixed doping to form a doped metal fluoride hybrid active material:

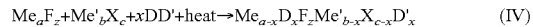

$$Me_aF_z+Me'_bX_c+xDD'+heat\rightarrow Me_{a-x}D_xF_zMe'_{b-x}X_{c-x}D'_x \quad (IV)$$

where the values of a, b, c, x and z depend on the valence of the particular dopants (D and D') selected. Preferred mixed dopants include certain combinations of transition metals and chalcogens. According to certain embodiments, the mixed dopant precursor (DD') can be $HgSe$, $HfO_2$, $V_2O_5$, $WO_3$, $ReO_2$, $VOF_3$, and combinations thereof. In Formulas II, III, and IV, a is the stoichiometric doping amount of the dopant or dopants.

While certain of the examples herein employ copper fluoride as the metal fluoride active material and a nickel complex as the precursor, it is understood that other metal fluoride active materials and metal complexes are within the scope of the disclosure. In certain embodiments, the metal fluoride is $CuF_2$ and the metal complex is $NiO$. Doping was confirmed by powder X-ray diffraction.

EXAMPLES

The following examples describe specific aspects of some embodiments of the invention to illustrate and provide a description for those of ordinary skill in the art. The examples should not be construed as limiting the invention, as the examples merely provide specific methodology useful in understanding and practicing some embodiments of the invention.

Materials and Synthetic Methods.

All reactions were prepared in a high purity argon filled glove box (M-Braun, $O_2$ and humidity contents <0.1 ppm). Unless otherwise specified, materials were obtained from commercial sources (e.g., Sigma-Aldrich, Advanced Research Chemicals Inc., Alfa Aesar, Strem) without further purification.

Synthesis of Hybrid Active Materials Rechargeable Cells.

Milling vessels were loaded with a metal fluoride at from about 85 weight percent to about 95 weight percent and reactant (metal oxide or metal oxide precursor) at from about 5 weight percent to about 15 weight percent, and the vessels were sealed. The mixture was milled. After milling, samples were annealed at from about 200 degrees Celsius to about 575 degrees C. for 1 to 12 hours under flowing $N_2$. Specific hybrid-forming reactants were processed as described below.

Preparation of $CuF_2/Cu_3Mo_2O_9$ Hybrid Active Materials.

Milling vessels were loaded with $CuF_2$ (85 weight percent) and $MoO_3$ (15 weight percent), sealed, and then milled. After milling, samples were annealed at 450 degrees Celsius for 6 hours under flowing $N_2$.

Preparation of $CuF_2/NiO$ Hybrid Active Materials.

Milling vessels were loaded with $CuF_2$ (85 weight percent) and NiO (15 weight percent), sealed, and then milled. After milling, samples were annealed at 325 degrees Celsius for 6 hours under flowing $N_2$.

Synthesis of Doped Hybrid Active Materials.

Doped hybrid active materials were synthesized using a process that includes both milling and annealing. Typically, metal fluoride precursors (e.g., $CuF_2$), and a metal complex (e.g., NiO) were milled together with the dopant precursor (e.g., $AlF_3$, $FeF_2$, $FeF_3$, $BiF_3$), followed by an annealing step. The temperature of the annealing step depends upon the choice of metal fluoride, but is typically performed between 200 to 400 degrees Celsius. Generally, doping was carried out in quantities of 0.01 and 0.1 equivalents. Certain materials were tested in quantities up to 0.5 equivalents Electrode Formulation.

Cathodes were prepared using a formulation composition of 80 weight percent active material, 15 weight percent binder, and 5 weight percent conductive additive according to the following formulation method: about 133 mg PVDF (Sigma Aldrich) and about 44 mg Super P Li (Timcal) was dissolved in 10 mL NMP (Sigma Aldrich) overnight. 70 mg of doped active material powder was added to 1 mL of this solution and stirred overnight. Films were cast by dropping about 70 L of slurry onto stainless steel current collectors and drying at 150 degrees C. for about 1 hour. Dried films were allowed to cool, and were then pressed at 1 ton/cm². Electrodes were further dried at 150 degrees C. under vacuum for 12 hours before being brought into a glove box for battery assembly.

Electrochemical Characterization of Electrochemical Cells Containing Doped Electrodes.

All batteries were assembled in a high purity argon filled glove box (M-Braun, $O_2$ and humidity contents <0.1 ppm), unless otherwise specified. Cells were made using lithium as an anode, Celgard 2400 separator, and 90 μL of 1M $LiPF_6$ in 1:2 EC:EMC electrolyte. Electrodes and cells were electrochemically characterized at 30 degrees C. with a constant current C/50 charge and discharge rate between 4.0 V and 2.0 V for the first and second cycle. Subsequent cycling was performed at C/2 between the same voltage limits.

Table 1 presents performance characterization data for batteries formed with electrodes having a $CuF_2/NiO$ hybrid active material that has been doped via the dopant precursors listed. The control is battery formed with an electrode having an undoped $CuF_2/NiO$ hybrid active material. In this case, the measured performance characteristic is irreversible capacity loss, in which lower numbers indicate performance improvements.

TABLE 1

Characterization of irreversible capacity loss

| Doping Precursor | Dopant Quantity (eq.) | ICL (%) |
| --- | --- | --- |
| control | 0 | 46(2) |
| $SnF_4$ | 0.02 | 30 |
| $AlF_3$ | 0.1 | 36 |
| $SnF_2$ | 0.1 | 36 |
| $FeF_2$ | 0.2 | 37 |
| $FeF_3$ | 0.1 | 38 |
| $TaF_5$ | 0.1 | 38 |
| $FeF_2$ | 0.1 | 39 |
| $NbF_5$ | 0.1 | 39 |
| $TiF_3$ | 0.1 | 39 |
| $CrF_2$ | 0.1 | 40 |
| $TiF_4$ | 0.1 | 40 |
| $AlF_3$ | 0.02 | 42 |
| $TiF_3$ | 0.02 | 42 |
| $FeF_2$ | 0.3 | 43 |
| $TiF_4$ | 0.02 | 43 |
| $CoF_3$ | 0.1 | 44 |
| $SnF_2$ | 0.02 | 44 |

Table 1 shows that several doping precursors yield doped materials according to embodiments disclosed herein that demonstrate performance improvement in irreversible capacity loss as compared to the undoped hybrid active materials.

Table 2 presents performance characterization data for batteries formed with electrodes having a $CuF_2/NiO$ hybrid active material that has been doped via the dopant precursors listed. The control is battery formed with an electrode having an undoped $CuF_2/NiO$ hybrid active material. In this case, the measured performance characteristic is capacity at the second cycle above 2.7 V, in which higher numbers indicate performance improvements.

TABLE 2

Characterization of capacity at the second cycle above 2.7 V

| Doping Precursor | Dopant Quantity (eq.) | Cy2 Cap. >2.7 V (mAh/g) |
| --- | --- | --- |
| control | 0 | 125(6) |
| $AlF_3$ | 0.02 | 153 |
| $FeF_3$ | 0.1 | 152 |
| $SnF_4$ | 0.02 | 146 |
| $TaF_5$ | 0.02 | 145 |
| $TiF_4$ | 0.02 | 145 |
| $HgF_2$ | 0.02 | 144 |
| $InF_3$ | 0.02 | 144 |
| $SnF_2$ | 0.02 | 143 |
| $CrF_3$ | 0.1 | 141 |
| $TiF_3$ | 0.02 | 140 |
| $Hg_2F_2$ | 0.02 | 137 |
| $VF_3O$ | 0.02 | 136 |
| $GaF_3$ | 0.02 | 136 |
| NiSe | 0.02 | 135 |
| $CrF_2$ | 0.1 | 135 |

TABLE 2-continued

Characterization of capacity at the second cycle above 2.7 V

| Doping Precursor | Dopant Quantity (eq.) | Cy2 Cap. >2.7 V (mAh/g) |
|---|---|---|
| $NbF_5$ | 0.02 | 134 |
| $SbF_3$ | 0.02 | 134 |
| CuO | 0.02 | 131 |
| CuS | 0.02 | 131 |

Table 2 shows that several doping precursors yield doped materials according to embodiments disclosed herein that demonstrate performance improvement in high voltage capacity as compared to the undoped hybrid active materials.

Table 3 presents performance characterization data for batteries formed with electrodes having a $CuF_2$/NiO hybrid active material that has been doped via the dopant precursors listed. The control is battery formed with an electrode having an undoped $CuF_2$/NiO hybrid active material. In this case, the measured performance characteristic is capacity at the fifteenth cycle as a percentage of the capacity at the third cycle. The third cycle is chosen as the reference to minimize the effects of formation that may be occurring on the first two cycles. In this measurement, higher numbers indicate performance improvements, and higher capacity is desirable. This measurement relates to capacity cycle life.

TABLE 3

Characterization of capacity retention at the 15th cycle

| Doping Precursor | Dopant Quantity (eq.) | Cy 3 Capacity (mAh/g) | Cy 15 Capacity (mAh/g) | Capacity Retention (%) |
|---|---|---|---|---|
| control | 0 | 133 (10) | 100 (10) | 75 |
| $Hg_2F_2$ | 0.1 | 76 | 75 | 98 |
| $HgF_2$ | 0.1 | 97 | 91 | 94 |
| $LaF_3$ | 0.02 | 110 | 101 | 92 |
| $GaF_3$ | 0.1 | 120 | 105 | 88 |
| $HfO_2$ | 0.02 | 107 | 92 | 86 |
| $Hg_2F_2$ | 0.02 | 147 | 124 | 85 |
| $HgF_2$ | 0.02 | 146 | 120 | 82 |
| $CdF_2$ | 0.1 | 123 | 100 | 81 |
| $BiF_3$ | 0.1 | 139 | 111 | 80 |
| $LaF_3$ | 0.1 | 70 | 55 | 79 |
| $BiF_3$ | 0.02 | 90 | 68 | 76 |
| $AgF_2$ | 0.02 | 126 | 93 | 74 |
| $YF_3$ | 0.1 | 83 | 61 | 74 |
| $CeF_3$ | 0.1 | 90 | 70 | 73 |
| $ZnF_2$ | 0.02 | 75 | 54 | 70 |
| $CoF_3$ | 0.02 | 96 | 50 | 55 |

Table 3 shows that several doping precursors yield doped materials according to embodiments disclosed herein that demonstrate performance improvement in capacity retention as compared to the undoped hybrid active materials.

Certain embodiments disclosed herein relate to a composition for use in forming a cathode for a battery, and the composition includes a metal fluoride containing hybrid active material doped with a dopant. Without being bound by a particular theory or mechanism of action, the addition of the dopant: (i) improves the bulk conductivity of the composition as compared to undoped metal fluorides and undoped hybrid materials; (ii) changes the bandgap of the composition as compared to undoped metal fluorides and undoped hybrid materials; (iii) induces the formation of a conductive metallic network; (iv) stabilizes the grain boundaries, particularly in domains rich in metal fluoride, which can prevent sintering; and/or (v) facilitates a reaction with LiF formed on discharge, providing a more conductive LiF layer, preventing LiF segregation, and/or helping to catalyze the reaction back to the metal fluoride on charge.

Certain embodiments include a cathode formed using any of the compositions disclosed herein or a cathode formed using any of the methods disclosed herein. Certain embodiments include a battery formed from such cathodes.

While the invention has been described with reference to the specific embodiments thereof, it should be understood by those skilled in the art that various changes may be made and equivalents may be substituted without departing from the true spirit and scope of the invention as defined by the appended claims. In addition, many modifications may be made to adapt a particular situation, material, composition of matter, method, or process to the objective, spirit and scope of the invention. All such modifications are intended to be within the scope of the claims appended hereto. In particular, while the methods disclosed herein have been described with reference to particular operations performed in a particular order, it will be understood that these operations may be combined, sub-divided, or re-ordered to form an equivalent method without departing from the teachings of the invention. Accordingly, unless specifically indicated herein, the order and grouping of the operations are not limitations of the invention.

We claim:

1. An electrode, comprising:
   a reaction product of a metal fluoride compound, a metal complex, and a doping precursor, wherein the doping precursor comprises a metal and wherein the electrode has rechargeable capacity.

2. The electrode of claim 1 wherein the doping precursor is present in the rection product at an amount of 0.1 equivalents or less.

3. The electrode of claim 1 wherein the metal of the doping precursor is a transition metal.

4. The electrode of claim 3 wherein the transition metal is iron.

5. An electrode, comprising:
   a reaction product of a metal fluoride compound, a metal complex, and a doping precursor, wherein the doping precursor comprises a post-transition metal.

6. The electrode of claim 5 wherein the post-transition metal is aluminum.

7. The electrode of claim 5 wherein the post-transition metal is bismuth.

8. The electrode of claim 1 wherein the metal fluoride compound comprises copper fluoride.

9. The electrode of claim 1 wherein the metal complex comprises a metal oxide.

10. The electrode of claim 9 wherein the metal complex comprises nickel oxide.

11. A method of making an electrode, comprising:
    reacting a metal fluoride compound, a metal complex, and doping precursor to form a doped reaction product, wherein the doping precursor comprises a metal and the reacting includes a milling step; and
    forming the doped reaction product into an electrode having rechargeable capacity.

12. The method of claim 11 wherein the metal fluoride compound comprises copper fluoride.

13. The method of claim 11 wherein the metal complex comprises a metal oxide.

14. The method of claim 13 wherein the metal complex comprises nickel oxide.

15. The method of claim 11 wherein the metal of the doping precursor is a transition metal.

16. The method of claim 15 wherein the transition metal is iron.

17. The method of claim 11 wherein the metal of the doping precursor is a post-transition metal.

18. The method of claim 17 wherein the post-transition metal is aluminum.

19. The electrode of claim 1 wherein the doping precursor is a metal fluoride, wherein the metal fluoride of the doping precursor has a different composition than the metal fluoride compound of the reaction product.

20. The electrode of claim 1 wherein the doping precursor includes one or more of $CoF_3$, $FeF_2$, $FeF_3$, $A_lF_3$, $BiF_3$, $YF_3$, $LaF_3$, $TiF_3$, $TiF_4$, $NbF_5$, $TaF_5$, $CrF_2$, $CrF_3$, $AgF_2$, $ZnF_2$, $CdF_2$, $Hg_2F_2$, $HgF_2$, $GaF_3$, $InF_3$, $SnF_2$, $SnF_4$, $SbF_3$, or $CeF_3$.

* * * * *